Aug. 8, 1967   A. H. ULLRICH   3,335,082
METHOD AND SYSTEM FOR HANDLING AND TREATING SEWAGE
Filed March 14, 1966
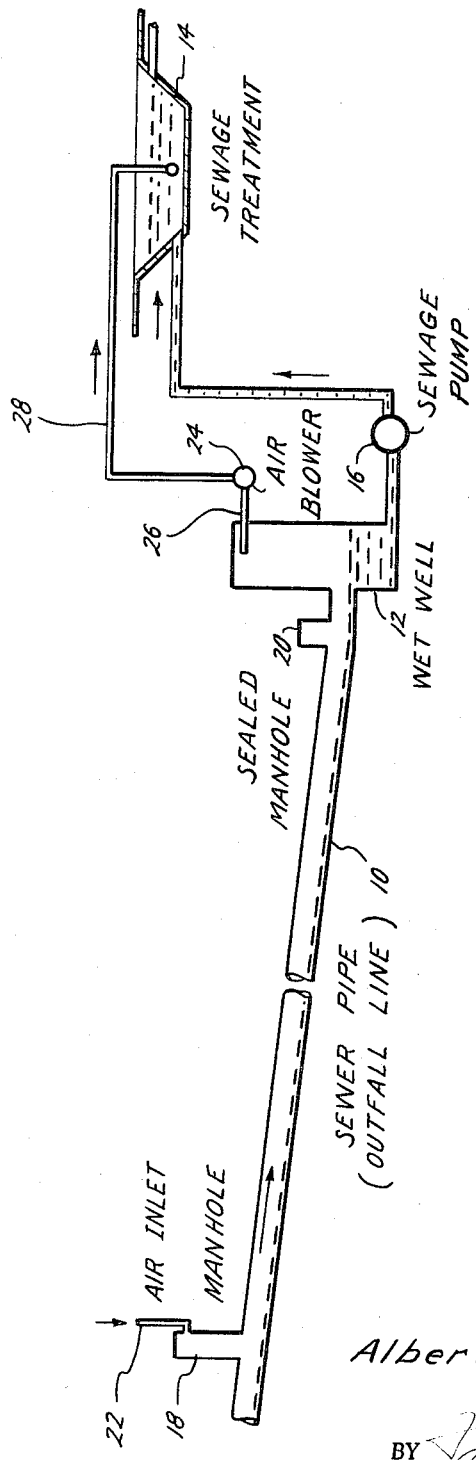
Albert H. Ullrich
INVENTOR.
BY
ATTORNEYS United States Patent Office 3,335,082
Patented Aug. 8, 1967

3,335,082
METHOD AND SYSTEM FOR HANDLING
AND TREATING SEWAGE
Albert H. Ullrich, Austin, Tex., assignor to Austin Concrete Works, Inc., Austin, Tex., a corporation of Texas
Filed Mar. 14, 1966, Ser. No. 540,449
3 Claims. (Cl. 210—15)

The present invention relates to a new and improved system for and method of handling and treating sewage to prevent deterioration of sewer pipes and to eliminate odors.

Sewage which does not have access to oxygen turns septic and produces hydrogen sulfide. In sewer pipes water which evaporates from the sewage condenses on the interior of the pipe above the flowing sewage. The combination of hydrogen hulfide with the condensed water forms sulfuric acid which rapidly causes deterioration of most types of sewer pipes. Additionally, the hydrogen sulfide is an extremely offensive odor.

Therefore, an important object of the present invention is to provide an improved system for and method of handling and treating sewage to eliminate odors and prevent deterioration of the sewer pipes.

Another object is to provide an improved system for and method of handling and treating sewage in which sufficient oxygen is made available to the sewage to minimize formation of hydrogen sulfide.

A further object is to provide a method of circulating air at a controlled rate through a sewer pipe to minimize hydrogen sulfide formation, to minimize condensation on the interior of the sewer pipe and to utilize such air in the subsequent treatment of the sewage.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

The figure is a schematic elevation view of a sewage handling and treating system including the improved air circulation system of the present invention.

In the drawing, the sewage handling and treating system includes the sewer pipe 10, connected to deliver sewage to the wet well 12, the sewage treatment installation 14 and the sewage pump 16 which delivers sewage from the wet well 12 to the sewage treatment installation 14. As in normal sewage handling systems, manholes 18 and 20 are provided connecting into the sewer pipe 10. The sewer pipe 10 is illustrated to be an outfall line which conducts sewage from a gathering system to the wet well 12.

To include the improvements of the present invention, the manholes 18 and 20 and the wet well 12 are all sealed. The manhole 18 is provided with a suitable air inlet 22 through which air is drawn into the system. The air blower 24 is connected with its suction line 26 exposed to the interior of wet well 12 to draw air therefrom, and the discharge line 28 is connected to discharge air into the sewage treating installation 14.

The air blower 24 is selected to have sufficient capacity to draw air through the air inlet 22, the sewer pipe 10 and the wet well 12 at a flow rate sufficient to supply enough oxygen to the sewage to prevent or at least minimize the generation of hydrogen sulfide and also to prevent or at least minimize condensation on the interior of the sewer pipe. The selection of the capacity of the air blower 24 should be made considering the minimum quantity of air which is sufficient for the aforementioned purposes at the worst conditions of temperature, sewage flow rates and condition of the sewage. For example, in a sewer pipe having a diameter of forty-two inches, a complete change of air at least once every twelve hours may be satisfactory but it is preferred that the air flow be sufficient to provide a complete change of air every six hours.

In operation, the air blower 24 draws air into the sewer pipe 10 through the inlet 22 since all other possible air inlets closer to the suction line 26 are sealed. The air flows through the sewer pipe 10 and the wet well 12 at a rate sufficient to at least minimize hydrogen sulfide generation and water condensation. By providing a sufficient quantity of air flowing over the sewage, a small amount of dissolved oxygen can be maintained in the sewage thereby keeping the sewage fresh and minimize the generation of hydrogen sulfide. The presence of absorbed oxygen in the sewage reduces the strength of the sewage, that is, satisfies its biochemical oxygen demand. The availability of the oxygen to the sewage in the sewer pipe 10 treats or stabilizes the sewage in proportion to the oxygen absorbed.

The air, together with all gaseous odors, is conducted to the sewage treatment installation 14 where the air is brought into intimate contact with the sewage. In this contact the air is used to treat the sewage and in aeration treating of the sewage may supply a substantial amount of the air needed for the aeration. In a trickling filter treating system the contact between the air and the sewage assists in the sewage treatment. This intimate contact between the air and the sewage, in addition to treating the sewage, has the added advantage of removing the odors from the air.

In the event that controlled flow of air through a sewage line is desired to prevent deterioration of the sewer pipe and no sewage treatment system is available for use of the air, then it is contemplated that air withdrawn from the sewage line be treated to remove the odors therefrom. Generally, it is preferred that the air which is circulated through the sewer pipe be used to treat sewage. For this reason, it is desirable to have the air blower positioned at a point near the sewage treatment installation and the air inlet into the sewer pipe at a distance therefrom. In such installation, the sewage and the air flow through the sewer pipe in the same direction. Also, by locating the blower near the sewage treatment installation the maximum utilization of the blower output is achieved.

From the foregoing it can be seen that the present invention provides an improved method of handling and treating sewage in which the sewer pipe is protected from deterioration and the usual odors from sewage are not released into the atmosphere. The flow of air at controlled flow rates through the sewer pipes accomplishes the desirable results and the air is utilized in many systems to treat the sewage.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:
1. The method of treating sewage flowing through a sewer pipe, a wet well and to a sewage treatment installation comprising,
   continuously flowing air through the sewer pipe in contact with the sewage therein at a controlled flow rate to maintain sufficient oxygen available to the sewage to thereby minimize hydrogen sulfide formation in this sewage and to minimize moisture condensation on the interior of the sewer pipe, withdrawing said air from said sewer pipe, conducting said withdrawn air to said sewage treatment installation, and contacting said withdrawn air with sewage in said sewage treatment installation to supply oxygen for sewage treatment and to remove odors from said air.

2. The method of handling and treating sewage in a sewage system which includes a sewer pipe connected into a wet well and a sewage treatment installation comprising, flowing sewage through said sewer pipe into said wet well, pumping said sewage from said wet well to said sewage treatment installation, flowing air into said sewer pipe at a point remote from said wet well, withdrawing air from said wet well at a controlled rate to maintain a continuous flow of air through said sewer pipe at a rate sufficient to minimize hydrogen sulfide formation and moisture condensation in said sewer pipe, conducting said withdrawn air to said sewage treatment installation, and flowing said withdrawn air into intimate contact with the sewage in said sewage treatment installation whereby odors are removed from said air and said air assists in the treating of said sewage.

3. A sewage handling system, comprising a wet well adapted to receive sewage, a sewer pipe connected to said wet well to deliver sewage thereto, an air inlet into said sewer pipe spaced a substantial distance from said wet well, means withdrawing air from said wet well at a controlled flow rate, said withdrawing means having a capacity to create a controlled flow of air from said inlet through said sewer pipe sufficient to minimize hydrogen sulfide formation and moisture condensation in said sewer pipe, a sewage treating installation adapted to treat sewage, means delivering sewage from said wet well to said sewage treating installation, and means connecting said withdrawing means to said sewage treating installation to provide intimate contact between the withdrawn air and the sewage whereby the sewage is treated by said air and the odors are removed from said air.

References Cited

UNITED STATES PATENTS 1,963,354   6/1934   Currie _____ 210—221 X

OTHER REFERENCES

Bowerman, F. R., et. al., Garbage, Detergents, and Sewers, Journ. WPCF, May 1962, vol. 34, pp. 475, 476, 482, 485, 489 and 490.

Pomeroy, R., Generation and Control of Sulfide in Filled Pipes, Sewage and Industrial Wastes, September 1959, vol. 31, pp. 1082–1095.

MORRIS O. WOLK, *Primary Examiner.*

MICHAEL E. ROGERS, *Examiner.*